May 3, 1932.  A. PERSSON  1,856,505

VALVE

Filed Feb. 1, 1930

Inventor

Anders Persson

By Cyrus N. Anderson

Attorney

Patented May 3, 1932

1,856,505

UNITED STATES PATENT OFFICE

ANDERS PERSSON, OF LIDINGO, SWEDEN, ASSIGNOR TO AMERICAN GASACCUMULATOR COMPANY, OF ELIZABETH, NEW JERSEY, A CORPORATION OF NEW JERSEY

VALVE

Application filed February 1, 1930, Serial No. 425,110, and in Sweden February 16, 1929.

The present invention refers to a valve of the kind in which the valve body consists of ebonite or other comparatively soft, elastic material, by means of which a good and reliable seating is obtained. It has been found that when such valves are employed for certain kinds of fluids, such as oxygen gas, the fluid affects the valve body, so that the contact surface of the same is worn and the seating is made unreliable.

The invention has for object to avoid said inconvenience, and consists therein, that the seating or contact surface of the valve body, co-operating with the valve seat, and also if desirable other parts of the valve body, which are exposed to the influence of the fluid, is provided with a coating of a suitable metal, which is not affected by the fluid in question. This coating may, especially when employed upon the seating surface of the valve body, be made so thin that it does not interfere with the elastic effect of the ebonite to which the proper seating of the valve is due and yet have the strength to provide the necessary wearing qualities. The metal coating moreover has the advantage of conducting heat to the seat of the valve because it is a better conductor of heat than the ebonite. This fact reduces the inclination to an irregular flow of fluid through the valve owing to freezing phenomenon appearing at the valve seat, when the fluid, such as gas, is taken from a cold receiver.

The valve is employable in all cases, when a reliable seating is necessary, and when a valve body of metal or a homogeneous metallic washer, from the point of view of close seating, offers so great difficulties, that it scarcely can be employed.

Figure 1:
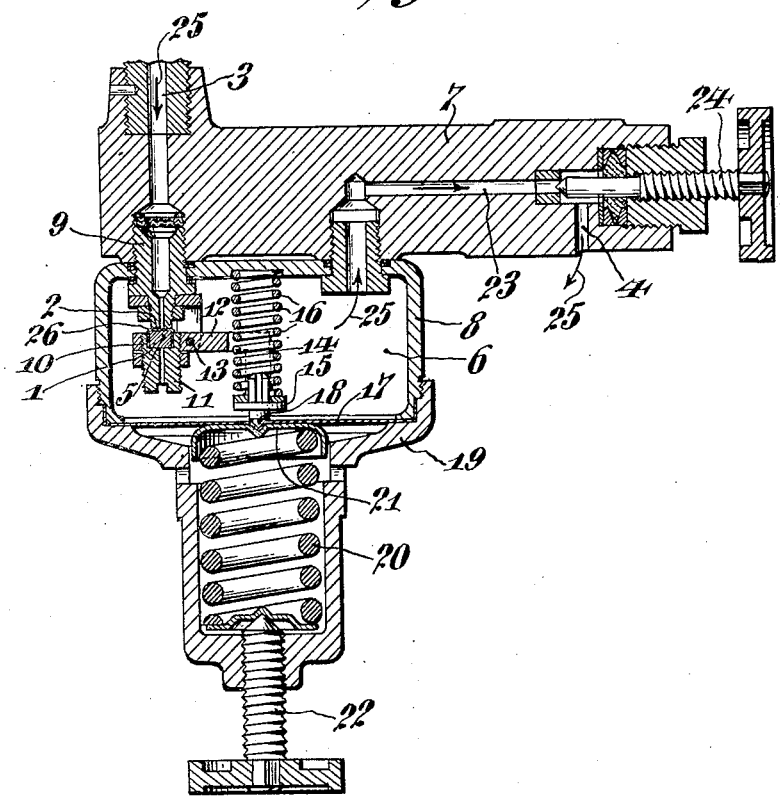
Figure 2:
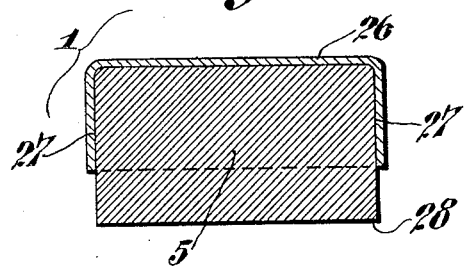

On the drawings Fig. 1 is a vertical section of reduction apparatus for oxygen gas of a previously well known type, to which the invention is applied. Fig. 2 is a vertical section on a larger scale of the valve body, constructed in accordance with the invention.

3 indicates the gas inlet channel leading into the gas chamber 6 of the reduction apparatus, the two parts of the casing of which are indicated with 7, 8. The lower part of the gas inlet channel 3 passes through an externally screw-threaded metal piece 9, by means of which the two parts 7, 8 of the apparatus casing are secured together. The inner end of this metal piece forms a valve seat 2, towards which the valve body 1 is adapted to move. For this purpose the valve body 1 is carried in a recess 10 provided in the inner end of a screw plug 11, screwed into one end of a lever 12 fulcrumed at 13, the other end 14 of which is fork shaped and extends toward a plate 15, between which and the part 8 of the casing a spring 16 is inserted.

The plate 15 engages a diaphragm 17 by means of a point 18, said diaphragm 17 tightly closing the chamber 6 and kept in position by threads on a casing 19. In this casing a spring 20 is located between a plate 21 on the under side of the diaphragm 17 and a plate seated on the bottom of the casing 19. The latter plate may be adjusted by a screw 22 to vary the tension of said spring 20.

In the casing part 7 an exhaust channel 23 opening in the upper part of the chamber 6 on the one side and leading to the consumption place by means of a channel 4 on the other side is provided. 24 indicates adjusting means for adjusting the flow of gas through this latter channel 4. The flow of gas is illustrated by arrows 25.

As shown on a larger scale in Fig. 2 the valve body, indicated by the letter 1, in Fig. 1 consists of a piece of ebonite 5 or other elastic material, which is provided with a metallic coating 26. In the drawing this coating extends over the contact surface of the valve body as well as over its lateral surface 27, not quite down to the lower edge 28 of said lateral surface 27, so that the metallic coating does not prevent the compression of the piece of ebonite when contact pressure is applied.

Having now described the invention and also the manner in which the same is to be carried out, what I claim is:

1. A valve member consisting of elastic material and a coating which partially covers the said member, one portion of said coating constituting the seating surface of said valve member.

2. A valve member consisting of a piece of elastic material and a metallic coating covering a portion only of the said valve member, a part of the said portion constituting the contact surface of the said valve member.

3. A valve member consisting of a valve body of elastic material and a metal coating covering the seating end of the said valve member and also covering portions of the sides thereof, the portion of said coating covering the seating end of said valve member facing the seat with which the said valve member co-operates.

In testimony that I claim the foregoing as my invention I have hereunto signed my name this 13th day of January, A. D. 1930.

AND. PERSSON.